BICKELL & NORACONK.
Feather Renovator.
No. 107,999. Patented Oct. 4, 1870.
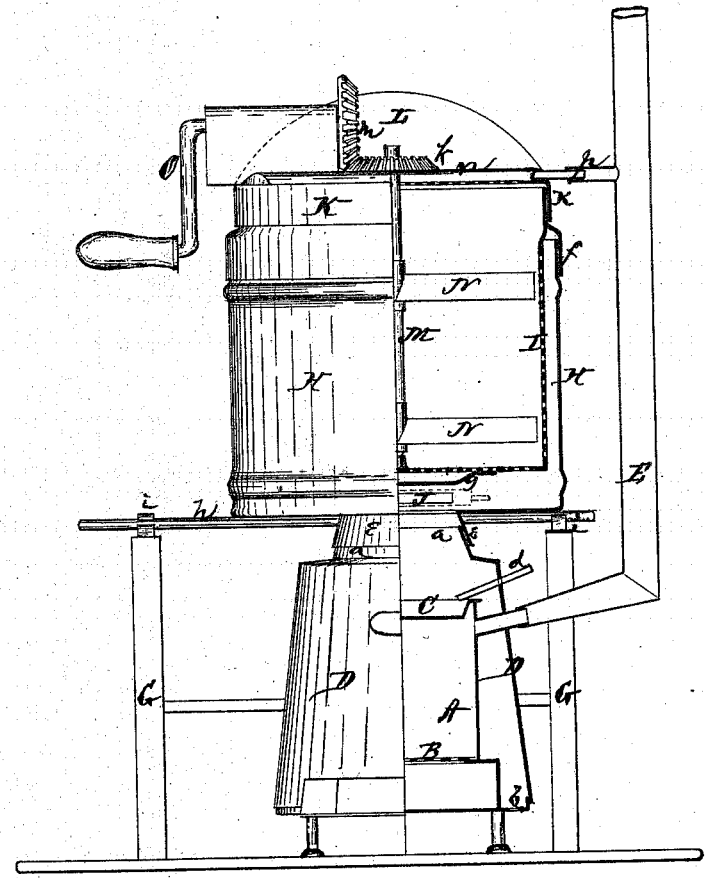
Witnesses:
Chas Jacobs
J. O. White
Inventors:
Elias Bickell.
M. F. Noraconk
Per
T. H. Alexander
Atty.

United States Patent Office.

ELIAS BICKELL AND MICHAEL F. NORACONK, OF MILTON, PENNSYLVANIA.

Letters Patent No. 107,999, dated October 4, 1870.

IMPROVEMENT IN FEATHER-RENOVATORS.

The Schedule referred to in these Letters Patent and making part of the same

*To all whom it may concern:*

Be it known that we, ELIAS BICKELL and MICHAEL F. NORACONK, of Milton, in the county of Northumberland and State of Pennsylvania, have invented certain new and useful Improvements in Feather and Hair-Renovators; and we do hereby declare that the following is a full, clear, and exact description thereof, reference being had to the accompanying drawing and to the letters of reference marked thereon, which form a part of this specification.

The nature of our invention consists in the construction and arrangement of an apparatus for renovating feathers and hair, as will be hereinafter fully set forth.

In order to enable others skilled in the art to which our invention appertains to make and use the same, we will now proceed to describe its construction and operation, referring to the annexed drawing, which represents a front elevation of our apparatus, one-half in section.

A represents a stove, with grate, B, and the top closed by means of a pan, C.

Around this stove is a shell, D, having an opening on top, with an upward-projecting collar or rim, a, around said opening.

The lower edges of the stove A and outer shell D are connected together by a perforated flange, b, through which the air is taken in at the bottom and discharged, heated, at the top.

The smoke, &c., from the stove passes upward through the pipe E.

Another pipe or spout, d, leads through the outer shell D into the pan C, for the purpose of introducing water into the same.

Upon supports, G G, on each side of the stove, rests a tank or kettle, H, provided, in the center of its bottom, with an opening, having a downward-projecting flange, e, said flange being in the shape of an inverted funnel, and fitting over the flange a on the shell D.

Inside of the vessel H is placed another vessel, I, having a flange, f, as seen, to fit closely over the upper edge of the outer vessel H. The bottom and sides of the inner vessel are perforated, so that the heat arising from the stove may pass into the same, but under the bottom of the vessel I.

Directly above the opening in the bottom of the outer vessel H is attached a plate, g, to prevent the heat from passing directly up through the center of the inner vessel, which would cause the contents of said inner vessel to be scorched.

Near the bottom of the outer vessel H, on the rear side, is a sliding door, J, to be opened when it is desired to cool off the inner vessel.

Under the bottom of the outer vessel H, nearer to one side than the other, is secured a rod, h, which rests in bearings, i i, upon the supports G G, thus, as it were, hinging the vessel, so that it can be readily turned over, to empty it of its contents.

The vessel I is covered by a lid, K, a portion, L, of which is hinged, so that, when the vessel is turned over, the contents may be emptied without removing the entire lid.

Through the center of the lid K passes a shaft, M, having its lower bearing in the center of the bottom of the inner vessel I.

On this shaft are arms, N N, placed inclined, as shown, and upon the upper end of the shaft is a miter-wheel, k, which gears with a similar wheel, m, upon the end of a shaft and crank, O, by means of which the central shaft M and its arms N N may be turned in either direction.

On the top of the lid K is attached a semicircular tube, n, the lid being perforated under said tube, and a small pipe, p, leads from this tube into the smoke-stack E, to carry off all impure air and steam rising from the inner vessel I.

The feathers are placed in the perforated vessel I, and the two vessels turned over in position above the stove, which should be previously heated. The heat rising from the stove passing through the perforations in the vessel I, soon heats the feathers. When they are sufficiently heated, water is poured through the spout d into the pan C, and is at once converted into steam, which also passes up through the feathers. The feathers being heated before any steam is admitted, no condensation takes place, but the steam, absorbing all impurities in the feathers, passes out through the tubes n and p, and the smoke-stack E.

When the water has been all converted into steam, the heated air from the stove takes its place, and soon completely dries the feathers.

During the whole of this process the crank O is operated so as to turn the shaft M and arms N N first in one direction and then in the other, whereby the feathers are constantly agitated, being alternately raised up and lowered.

Hair may be renovated in precisely the same manner.

Having thus fully described our invention,

What we claim as new, and desire to secure by Letters Patent, is—

1. The combination of the hinged outer vessel H, perforated inner vessel I, plate g, shaft M, and arms N N, all constructed and arranged substantially as and for the purposes herein set forth.

2. The perforated lid k, tube n, and pipe p, leading into the smoke-stack E, all substantially as and for the purposes herein set forth.

In testimony that we claim the foregoing as our own, we affix our signatures in presence of two witnesses.

ELIAS BICKELL.
MICHAEL F. NORACONK.

Witnesses:
E. W. CHAPIN,
W. K. WERTMAN.